3,466,435
MARKING AND PROJECTION LAMP FOR
AIRCRAFT RUNWAYS
Fritz Brunner, Oerlikonerstrasse 35,
Zurich, Switzerland
Filed May 15, 1967, Ser. No. 638,253
Claims priority, application Switzerland, June 1, 1966,
7,918/66
Int. Cl. B64f 1/20
U.S. Cl. 240—1.2        10 Claims

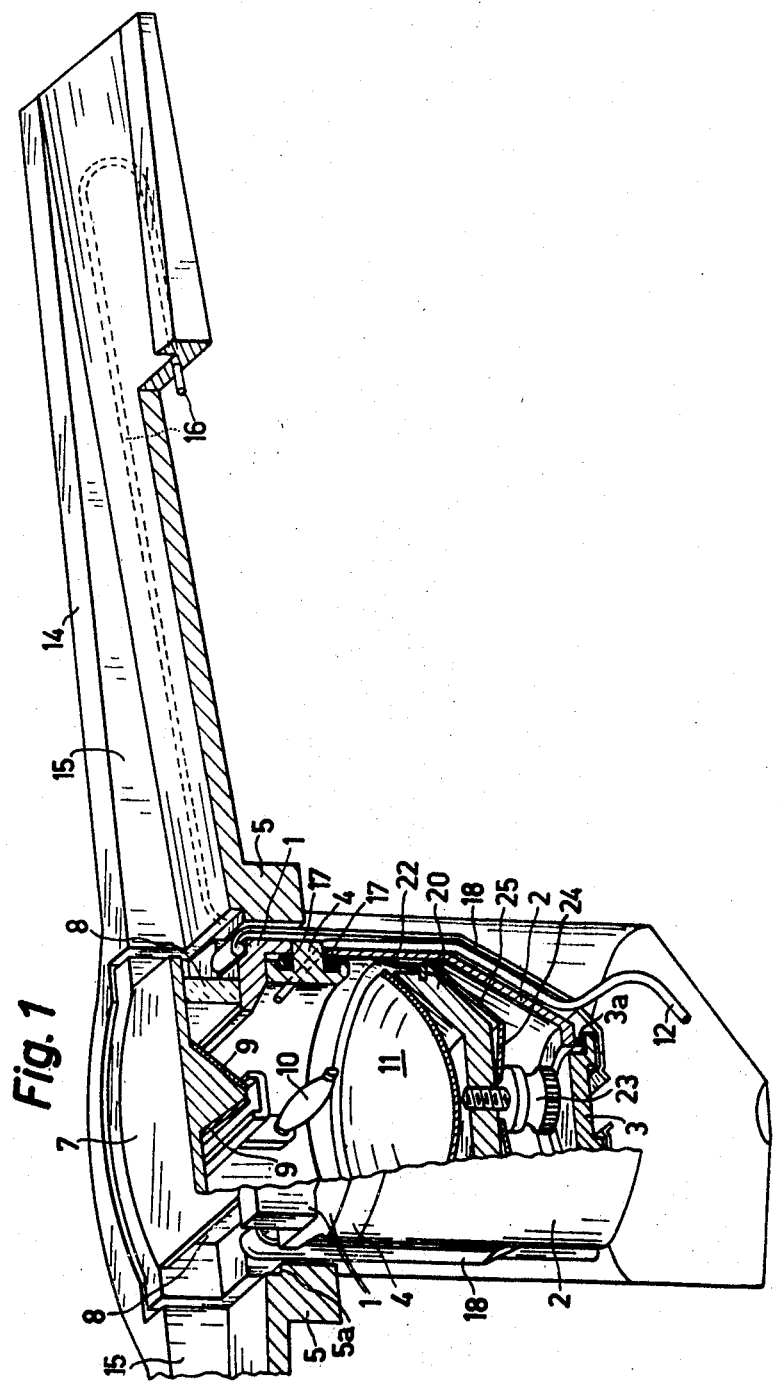

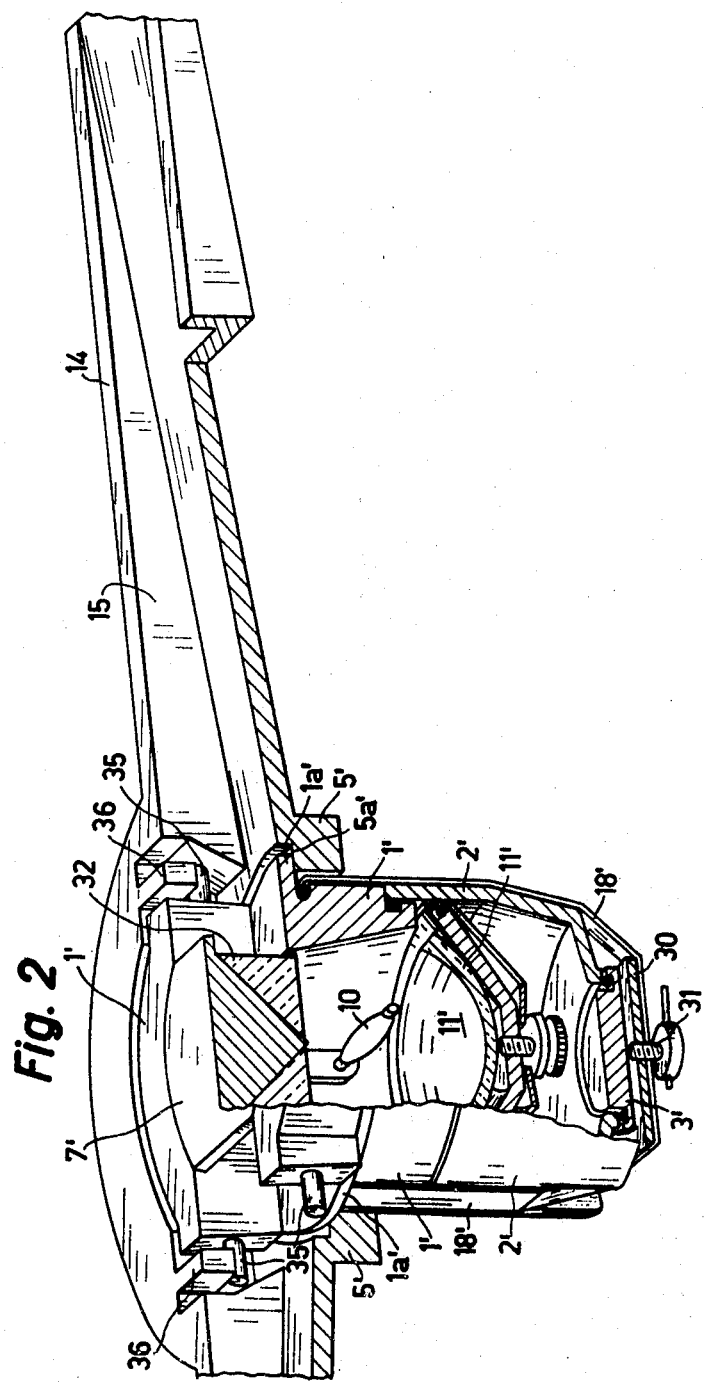

ABSTRACT OF THE DISCLOSURE

The marking and projection lamp for aircraft runways comprises a base plate which is fixedly mounted in the runway, and a sealed, generally cylindrical housing which is removably mounted in an opening in the base plate. A concave mirror is adjustably mounted in a detachable lower part of the housing. A light source is arranged above the concave mirror. An upper part of the housing carries at least one mirror or prism whereby the light reflected upwards by the concave mirror is directed as a slightly inclined beam over the runway surface. In front of the light exit openings of the housing upper part the base plate has radial arms in which there are provided inclined light channels.

---

This invention relates to a marking and projection lamp, for example for aircraft runways, which can be run over by vehicles, this lamp comprising a housing including a light source and an optical system.

In aircraft landing fields there is a need to mark the centre of the runway, the touchdown zone, and the apron by lights to facilitate use thereof by aircraft even under bad visibility conditions, for example in fog. It is at present found necessary, however, to ensure that these lights do not project into the surface of the runway, or only do so very marginally, so that the running of the aircraft wheels is not interfered with, and the clearance of snow similarly is not hampered. In cases where forced landings take place with the undercarriage or nose wheel retracted, any lamps which intrude into the runway represent an additional hazard and danger.

The marking and projection lamp according to the present invention is characterised by the fact that the housing comprises a lower part which is of cylindrical form over part at least of its length and which accommodates in its interior an adjustably mounted concave mirror, that an upper part of the housing is mounted detachably on the lower part directly or through the intermediary of a spacing ring and that the upper part of the housing has a flange which is supported on a base plate or ring which can be sunk into the ground and surrounds the upper part of the housing.

This provides for a marking and projection lamp which occupies little room, which can be neatly sunk into the ground but at the same time gives a flat light beam near to ground level. Moreover by virtue of this construction maintenance is greatly simplified because the housing, together with the light source, mirror and optical system, can be removed as a combined unit. After cleaning, the parts of the housing can be closed without any subsequent adjustment of the optical system generally being necessary.

Advantageously the upper part of the housing is closed at its upper side by a detachable cover having at least one optical reflecting member, for example a mirror or prism attached to its underside.

The base plate which remains in the runway preferably has at least one radially-projecting arm in which a light-emergent channel is formed and which is also sunk into the surface of the runway, at least in part. This radial arm may be equipped with a heating device to enable any snow in the channel to be melted.

The concave mirror may be fastened on a cradle which can be clamped to the inner wall of the lower part of the housing by means of a multi-armed resilient cone which is splayed over the cradle, this providing for a ready and accurate adjustment of the concave mirror. This mirror preferably comprises a glass body with two non-concentric, spherical surfaces, one of which is silvered.

Further details of the invention are described by the following description and embodiments thereof, given with reference to the accompanying drawings. In these drawings:

FIGURE 1 is a perspective illustration, partly broken away and in cross section, of a marking and projection member in accordance with a first embodiment of the invention, and FIGURE 2 is a view similar to that of FIGURE 1 but showing a second embodiment.

The marking and projection lamps illustrated in the drawings comprise an optical system and a light source installed in a housing, and these lamps are primarily used for luminating and marking the centre strip and the touch down zones of aircraft langing strips and runways.

The lamp illustrated in FIGURE 1 comprises a housing upper part 1, a housing lower part 2 with a bottom 3, a spacing ring 4 and a base plate 5. The upper part 1 has a flange (not visible in FIGURE 1) which rests on a shoulder 5a of base plate 5. The upper part 1 of the housing, and the other parts, are so dimensioned that they are able to sustain the maximum anticipated weights of aircraft and automobile vehicles. The base plate 5 and the upper part 1 of the housing, together with the cover 7 which is sunk into the latter, are let into the runway and the top thereof is flush with the surface of the latter or only projects slightly above it.

The upper part 1 of the housing has two windows 8 which extend nearly to the top face, these being disposed at diametrically opposite sides of the housing and being intended for the passage of light. Two reflectiing mirrors 9 are secured to the underside of cover 7, which is detachably secured to the upper part of the housing, and these mirrors 9 are approximately at right angles to one another and reflect the light from lamp 10 so as to direct it in the required directions through windows 8. This lamp 10 is located below the mirrors and is replaceable on the spacer ring 4 through the agency of a lamp holder. Disposed beneath lamp 10 is a concave mirror 11, such that light emergent from lamp 10 is concentrated by the mirror 11 and projected via mirrors 9 through windows 8 in the required directions. As light sources which will produce a beam which is concentrated to the maximum degree, it is most suitable, in principle, to use electric lamps in which the illuminating medium is of small dimensions with a high degree of light intensity, and which are dimensioned so as to promote the projection of the light in the required direction as far as is optimumly possible. Incandescent lamps and high pressure gas discharge lamps with cylindrical and flat illuminating bodies are particularly suitable for this purpose. The lamp 10 is connected to the current supply means through a cable 12 which is introduced into the interior of the housing. The housing unit is fastened to the base plate 5 by means of four countersunk pins which are at the upper part 1 of the housing.

The base plate 5 is provided with two radially projecting horizontal arms 14 which extend to opposite sides of the housing. Formed in each of these elongated arms 14 is a light channel 15 which extends upwards at an inclined angle, this channel being adjoined to the corresponding window 8 and thus providing for the emergence of a flat wide beam of light from the ground. The base plate 5 and the arms 14 are fabricated from a single piece of metal which assists the conduction and disposition of the heat generated by lamp 10. Each channel 15 is of a sufficiently narrow width for it to be impossible for the landing wheel of an aircraft to sink into it, and it will not therefore interfere with the rolling of the aircraft thereover. The edges of the light channel are rounded so that aircraft tires running over them will not be damaged. Installed in each of the arms 14 is a heating device in the form of an electrical heating cable 16. This heating device may, for example, be brought into use to melt snow deposited in the light channel.

Provided between the upper and lower parts of the housing and the spacer ring are packing rings 17 to provide a seal between these parts of the housing. These are held in place by spring clips 18 which are attached laterally to the housing. The upper parts of the clips 18 are inserted in a groove in the upper part of the housing, this enabling the upper and lower parts of the housing to be readily operated by simply pivoting the clips. At the same time clips 18 firmly retain the base 3 in position. A filter ring 3a is arranged between the bottom 3 and the lower rim of the lower part 2 of the housing, this serving to protect the latter against the ingress of dust, rain and water spray.

The concave mirror 11 is adjustably fastened in the interior of the lower parts of the housing. A cradle 20 is supported by a resilient insert 22 in the housing so as to be play-free, but adjustable, this enabling it to be shifted manually in the direction of the longitudinal axis and, if required, pivoted for adjustment. The concave mirror 11 is secured to the cradle 20, for example by cementing. The concave mirror is now brought into the accurately-adjusted position in the housing, and a clamping screw 23 which is threaded into the cradle 20 and passes with clearance through a hole in a spring plate 24, is then tightened up. This fastening screw 23, after the mirror has been adjusted to the required position, produces the firm clamping of the spring plate 24 to the mirror cradle 20, and on the other hand has the result that a plurality of lugs or blades 25 projecting in conical formation from the spring plate 24 are applied against the cylindrical inner wall of the housing and are urged against the latter. A substantial advantage of this adjusting mechanism is that the fixing of the concave mirror 11 can be carried out without there being any displacement of the positioning.

If all the light beam is to be projected in one direction only, a larger mirror is used in place of the two mirrors 9, or two mirrors which are approximately parallel and are offset stepwise one in relation to the other, steps then being taken to ensure that the enlarged light projection window 8 is not masked by any retaining or other means. The distribution of light in the emergent beam can be suited to prevailing requirements by slight modification of the parallelism of the two mirrors. Similar effects, of course, can be achieved by the use of curved mirrors at 9 or by using lenses for the windows 8. Another method of projecting all the light in one direction only is to divert the two pencils of light, which initially are directed diametrically opposite to one another, by additional mirrors or prisms through plus 90° or minus 90° in a horizontal plane and to allow them to emerge laterally through one window or two side by side windows.

It is also possible to make the base plate 5 and the arms 14 in more than one piece. Moreover it would be possible, instead of using one or two windows 8, to provide a larger number, the individual mirrors being offset at appropriate angles to one another, and use being made of a corresponding number of mirrors. Instead of using a plurality of mirrors one only might be employed, this being pivotable in one or other direction as required, or use may similarly be made of, for example, a cyclically-rotating so-called beacon mirror.

Moreover, in any of these instances, at least one colour filter may be provided at the or each window 8 or within the optical system, and this may be adapted for pivoting into and out of effective position or be replaceable.

FIGURE 2 shows a lamp which is similar to that of FIGURE 1, but in which some of the details of the latter have been modified. The lamp housing comprises an upper part 1' which is mounted directly on the lower part 2' of the housing without the interposition of a spacing ring. The two parts of the housing are held together by means of a single U-shaped clip 18' the ends of which are suspended from the upper part 1' of the housing. Clip 18' holds a plate 30 beneath the housing, this plate carrying a screw 31 which is used to press the bottom 3' tightly against the lower part 2' of the housing. This provides a housing which is completely air tightly sealed.

The upper part 1' of the housing has a flange 1a' which rests on a shoulder 5a' of the base plate 5'.

In the arrangement of FIGURE 2, the mirrors 9 and the light projection windows 8 are replaced by prisms 32 secured to the lower side of cover 7' and sealed relatively to the upper part 1' of the housing. Prisms 32 have totally-reflecting or mirrored surfaces which are of such an inclination as to throw the emergent light beam flat over the ground.

In this construction the lamp 10 is secured in a mounting which is fastened to the upper part 1' of the housing.

The concave mirror 11' is adjustably held in the lower part 2' of the housing in a similar manner to the arrangement described in connection with the FIGURE 1 construction, so that these retaining means have therefore not been specifically illustrated in FIGURE 2. In contrast to the simple mirror 11 of the lamp of FIGURE 1, however, the concave mirror 11' of FIGURE 2 is a focussing lens-forming mirror comprising a glass body with two eccentric, spherical bounding faces having a common axis of symmetrical rotation, the lower of these faces being silvered.

The body of the lamp can be fastened in the base plate 5' by various methods. An arrangement which recommends itself because it allows for very quick operation makes use of four cylindrical or slightly-conical pins 35 which are retained in the upper part 1' of the housing and are movable in the axial direction against spring action which enables them to be pressed fully or partially into the housing part 1'. These pins 35 engage under four lugs 36 on the base plate 5' to secure the body of the lamp.

To enable the lamp to be serviced, the pins 35 are depressed into the upper part 1' of the housing against the spring action by a pliers-like tool and the body of the lamp is lifted out of the base plate 5' by this same tool. The lamp body, or substitute, is inserted in the base plate with the same tool but by the reverse procedure.

To provide for very simple installation of the lamps described in an existing runway, the housing is of cylindrical form over at least a part of its length so that it is only necessary to make a round hole in the runway with channels extending therefrom in the longitudinal direction of the runway for accommodating arms 14, provision being made for inserting the lamps to a depth such that their upper surfaces are flush or approximately flush with the surface of the runway. Since the outer dimensions of the housing are comparatively small, the required holes in the surface of the runway can be made by small rotatable drills.

What I claim is:

1. A marking and projection lamp which resists damage even when run over by vehicles, said lamp comprising in combination: a base plate adapted to be sunk into and permanently fixed to the ground; a generally cylindrical housing completely closed on all sides and adapted to be releasably fastened in said base plate, said housing being detachable from said base plate as a unit; a light source mounted in said housing; a concave mirror mounted in said housing for directing light from said light source vertically upwardly, said concave mirror being adjustable on both horizontal axes and vertically displaceable in the housing relatively to said light source; and at least one reflecting surface mounted adjacent to the top of said housing; said housing being formed of at least two parts detachably connected together, said parts including a lower housing part which is of cylindrical form over at least a portion of its height, and an upper housing part including a flange adapted to be supported on said base plate.

2. A marking and projection lamp which resists damage even when run over by vehicles, said lamp comprising in combination: a base plate adapted to be sunk into and permanently fixed to the ground; a generally cylindrical housing being completely closed on all sides and adapted to be releasably fastened in said base plate and detachable from said base plate as a unit; a light source mounted in said housing; a concave mirror mounted in said housing for directing light from said light source vertically upwardly; and at least one reflecting surface mounted in the top of said housing; said housing being formed of at least two parts detachably connected together, said parts including a lower housing part which is of cylindrical form over at least a portion of its height and which has a cylindrical interior wall, and an upper housing part including a flange adapted to be supported on said base plate; said concave mirror being adjustably clamped in place on said cylindrical interior wall of said lower housing part so that it may be adjusted vertically and is pivotally adjustable about both of its horizontal axes.

3. The marking and projection lamp according to claim 2, including an intermediate ring detachably connected between said upper and lower housing parts, and means mounting said light source on said intermediate ring.

4. The marking and projection lamp according to claim 2, wherein said light source is mounted on said upper housing part.

5. The marking and projection lamp according to claim 2, wherein said base plate includes at least one radially projecting arm formed with a light channel therein.

6. The marking and projection lamp according to claim 5, wherein the radial arm of said base plate includes an electric heating device independent from the light source.

7. The marking and projection lamp according to claim 2, including a cradle for said concave mirror; a resilient insert for adjustably supporting said concave mirror and cradle on said cylindrical interior wall of the lower housing part; and a resilient cone made up of a plurality of blades formed into conical shape and splayed around the cradle for clamping said concave mirror and cradle to said interior wall.

8. The marking and projection lamp according to claim 2, wherein said housing includes a detachable bottom, and the lamp includes means for holding said detachable bottom tightly against the lower housing part to form a fluid tight seal.

9. The marking and projection lamp according to claim 2, wherein said concave mirror comprises a focussing lens mirror, the rear side of said lens mirror being silvered, said lens mirror including a glass body having two eccentric spherical bounding surfaces with a common axis of rotational symmetry.

10. The marking and projection lamp according to claim 2, wherein said upper housing part includes pins axially displaceable into said upper housing part against spring action, said pins, in their protruding positions, engaging below projections on said base plate.

References Cited

UNITED STATES PATENTS

| | | | |
|---|---|---|---|
| 359,243 | 3/1887 | Davis | 240—44.1 XR |
| 2,184,004 | 12/1939 | Pennow | 240—1.2 |
| 3,007,034 | 10/1961 | Reed et al. | 240—1.2 |
| 3,066,217 | 11/1962 | McDonald | 240—1.2 |
| 3,369,111 | 2/1968 | Svensson et al. | 240—1.2 |

FOREIGN PATENTS 135,174 5/1947 Australia.

NORTON ANSHER, Primary Examiner

RICHARD L. MOSES, Assistant Examiner

U.S. Cl. X.R.

240—2, 44.1